United States Patent
Kim et al.

(10) Patent No.: US 9,582,523 B2
(45) Date of Patent: Feb. 28, 2017

(54) APPARATUS AND METHOD FOR CONVERTING VO

(71) Applicant: SAMSUNG SDS CO., LTD., Seoul (KR)

(72) Inventors: Hyoung Soon Kim, Seoul (KR); Chang Hyun Baek, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 580 days.

(21) Appl. No.: 14/037,955

(22) Filed: Sep. 26, 2013

(65) Prior Publication Data
US 2014/0095523 A1 Apr. 3, 2014

(30) Foreign Application Priority Data
Sep. 28, 2012 (KR) .................. 10-2012-0108546

(51) Int. Cl.
*G06F 17/30* (2006.01)
*G06F 9/44* (2006.01)

(52) U.S. Cl.
CPC ...... *G06F 17/30289* (2013.01); *G06F 9/4435* (2013.01)

(58) Field of Classification Search
CPC .................. G06F 17/30289; G06F 9/4435
USPC ........................................... 707/756
See application file for complete search history.

(56) References Cited

U.S. PATENT DOCUMENTS

| 6,438,559 B1* | 8/2002 | White ............... G06F 17/30607 |
| 2002/0073395 A1* | 6/2002 | Gartner ............ G06F 17/30607 717/101 |
| 2004/0117571 A1* | 6/2004 | Chang ..................... G06F 9/465 711/162 |
| 2015/0019514 A1* | 1/2015 | Forster ............. G06F 17/30961 707/693 |

FOREIGN PATENT DOCUMENTS

| KR | 10-2005-0022272 A | 3/2005 |
| KR | 10-0583517 B1 | 5/2006 |
| KR | 10-2010-0067290 A | 6/2010 |

OTHER PUBLICATIONS

Communication dated Jan. 27, 2015 issued by Korean Intellectual Property Office in counterpart Korean Application No. 10-2012-0108546.

* cited by examiner

*Primary Examiner* — Jensen Hu
(74) *Attorney, Agent, or Firm* — Sughrue Mion, PLLC (57) ABSTRACT

An apparatus and a method for converting a value object (VO) are disclosed. An object generating unit reads out data recorded in an input file in specific units, and generates the VO corresponding to the specific units. An object processing unit includes a byte array storing a column value included in the specific units and an object array storing a field value of the VO, and processes provision and change of the column value. A metadata providing unit provides metadata including a size and a data type of each column included in the specific units for the object processing unit. According to the present invention, when generating the VO from data stored with different data formats, and when converting the VO into the different type of data formats, conversion costs are minimized and data processing performance is improved.

17 Claims, 10 Drawing Sheets

FIG. 1

| RECORD → | FIRST COLUMN | SECOND COLUMN | THIRD COLUMN | FOURTH COLUMN | FIFTH COLUMN |
|---|---|---|---|---|---|
| | 11111 | 2011-01-01 | A | GANG-NAM GU | GANG-NAM DONG |
| | 22222 | 2011-02-02 | B | SEO-CHO GU | SEO-CHO DONG |
| | 33333 | 2011-03-03 | C | YANG-PYEONG GU | YANG-PYEONG DONG |
| | 44444 | 2011-04-04 | D | DONG-JAK GU | DONG-JAK DONG |
| | 5 BYTES | 10 BYTES | 6 BYTES | 6 BYTES | 6 BYTES |

COLUMN ↓ (above FIRST COLUMN)

FIG. 2

```
public class Person {
        private int no;
        private Date date;
        private String name;
        private String gu;
        private String dong;

public int getNo () {return no;} public void setNo (int no) {this.no = no;} public Date getDate () {return date;} public void setDate (Date date) {this.date = date;} public String getName () {return name;} public void setName (String name) {this.name = name;} public String getGu () {returngu;} public void setGu (String gu) {this.gu = gu;} public String getDong () {return dong;} public void setDong (String dong) {this.dong = dong;}
}
```

```
public class Person2 extends AbstractVo {

@Length (5)
    private int no;
    @Length (10)
    private Date date;
    @Length (6)
    private String name;
    @Length (6)
    private String gu;
    @Length (6)
    private String dong;

public int getNo () { return super.getValue (0); } public void setNo (int no) { super.setValue (0, no); } public Date getDate() {return super.getValue (1); } public void setDate (Date date) { super.setValue (1, date); } public String getName () { return super.getValue (2); } public void setName (String name) { super.setValue (2, name); } public String getGu() { return super.getValue (3); } public void setGu (String gu) { super.setValue (3, gu); } public String getDong () { return super.getValue (4); } public void setDong (String dong) { super.setValue (4, dong); } }

```
interface   VoProxy { public void setValue(index, value);

public Object getValue(index);

public Object getRawData();

public void setRawData(rawData);

```
class ByteProxy implements VoProxy {

Decoder decoder
  Encoder encoder
  Metadata meta
  Array bytes
  Array values function init() {
    meta = MetadataProvider.getMetadata(Class of Value Object)
    values = new array ( meta.getColumnSize() )
  } function setValue(index, value) { values of index = value } funtion getValue(index) {
    if ( values of index == null )
      type = meta.getType(index)
      offset = meta.getOffset(index)
      length = meta.getLength(index)

values of index = decoder.decode(byte, type, offset, length)
    end if return values of index

} function setRawData(array rawData) { bytes = rawData }
  function getRawData() {
    index = 0
    loop ( value in values )
      if (value is modified )
        type = meta.getType(index)
        offset = meta.getOffset(index)
        length = meta.getLength(index)

encoder.encode(bytes, value, meta, index);
      end if
      index = index + 1
    end loop return bytes;  }
  }
}
```

FIG. 8

```
class MetadataProvider {

Cache cache function getMetadata(voClass) { if ( meta of voClass exists in cache )
       return cache.get(voClass)
    else
         VoMeta meta = parse(voClass)
         cache.set(voClass, meta)
         return meta
    end if
  } function parse(voClass) {
     VoMeta meta
     index = 0
     offset = 0 loop (field in fields of VoClass) {
        type = get type of field
        length = get value of @Length Annotation on field
          meta.setType(index, type)
          meta.setLength(index, length)
          meta.setOffset(index, offset)
        offset = offset + length
     } return meta
  }
}
```

APPARATUS AND METHOD FOR CONVERTING VO

CROSS-REFERENCE TO RELATED APPLICATION

This application claims priority to and the benefit of Republic of Korea Patent Application No. 10-2012-0108546, filed on Sep. 28, 2012, the disclosure of which is incorporated herein by reference in its entirety.

BACKGROUND

1. Field of the Invention

The present invention relates to an apparatus and a method for converting a value object (VO), and more particularly, to an apparatus and a method for converting a VO for generating the VO from data stored in a file, or storing the VO in the file.

2. Discussion of Related Art

A system for gathering and backing up data generally records data in a file, and then reads out the data from the file in order to process work. In a system developed with an object oriented language such as Java, a Java VO (VO) has to be encoded to match a file format in order to store the Java VO in a file. Conversely, the system has to decode the data stored in the file in order to generate the Java VO from the data stored in the file.

Accordingly, conversion costs are incurred for recording the Java. VO in the file or generating the Java VO from the file. Particularly, in the case of processing a large amount of data on the order of megabytes or gigabytes, such as in a financial batch system, high costs are required for data conversion and overall system processing performance is degraded.

A conventional system converts all data which is stored or will be stored in a file in the process of converting a Java VO and data stored in the file. That is, the conventional system generates the Java VO after decoding every column of data in order to process one file record. Even when storing the Java VO in the file, the conventional system encodes every field to generate the data. In this case, even when only a portion of the field is used in a practical work logic, since encoding and decoding have to be performed even for a remaining unused portion of the field, unnecessary operation costs are incurred. In order to overcome these problems, a developer can devise a program to only convert the practical used portion of the data in detail, but the amount and complexity of development required becomes too great and productivity is lowered.

Meanwhile, in order to generate a Java VO in a file or record the Java VO in the file, layout information of each column in the file, data type information of corresponding columns, and so on are needed. Further, based on the information, a task of dividing a record into columns and converting each column into a Java data type to correspond to a field of the Java VO, and conversely, a task of converting the field of the Java VO into record information matching the layout information of each column, are needed. A module of a system for performing these tasks is referred to as a mapper, and there are a general reflection mapper and a custom mapper.

The general reflection mapper sets a field name of the Java VO and column layout information corresponding to each field in the mapper, after this, calls and links a setter method of the Java VO based on the field name using the Java reflection. Various Java VOs can be processed with one mapper class.

The custom mapper exclusively configures a mapper embedding the column layout information in each Java VO, and explicitly calls and links a getter method and a setter method of the Java VO. Since the custom mapper explicitly calls a method of the Java VO, the custom mapper has a high speed.

However, calling a method using reflection of the general reflection mapper is slow and inconvenient because additional layout information has to be provided, compared with calling an explicit method of the custom mapper. On the other hand, the method using the mapper class of the custom mapper is fast but work is increased since an exclusive mapper class for each Java VO has to be further developed.

A system and method of mapping between a software object and structured language element-based documents are disclosed in Korean Patent No. 0583517, related to the present invention. The disclosed mapping system provides a common framework for mapping between the documents and the software object.

However, when only a portion of a practical work logic is used, encoding and decoding are still performed for a remaining unused field, and thus unnecessary operation costs are incurred.

SUMMARY OF THE INVENTION

The present invention is directed to an apparatus and a method for converting a VO that can decode only data used in a practical work logic when generating the VO from a file, and encode only data modified by the work logic when recording the VO in the file.

The present invention is further directed to a non-transitory computer-readable media having recorded thereon a program for executing the method for converting a value object that can decode only data used in a practical work logic when generating the VO from a file, and encode only data modified by the work logic when recording the VO in the file.

The present invention is further directed to a method that can execute conversion between a record and Java VO at a high speed, even without exclusively setting column layout information or developing a mapper class, by improving performance and development-related problems of a conventional mapper and describing mapping information in a Java VO.

According to an aspect of the present invention, there is provided an apparatus for converting a VO, including: an object generating unit configured to read out data recorded in an input file in specific units, and generate the VO corresponding to the specific units; an object processing unit configured to dude a byte array storing a column value included in the specific units and an object array storing a field value of the VO, and process provision and change of the column value; and a metadata providing unit configured to provide metadata including a size and a data type of each column included in the specific units for the object processing unit.

According to another aspect of the present invention, there is provided a method for converting a VO, including: reading out data recorded in an input file in specific units and generating the VO corresponding to the specific units; and processing provision or change of a column value using at least one of a byte array storing the column value included in the specific units, an object array storing a field value of the VO, and metadata including a size and a data type of each column included in the specific units.

BRIEF DESCRIPTION OF THE DRAWINGS

The above and other objects, features and advantages of the present invention will become more apparent to hose of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent those skilled in the art that various modifications can be made without departing from the spirit and scope of the invention.

Figure 1:
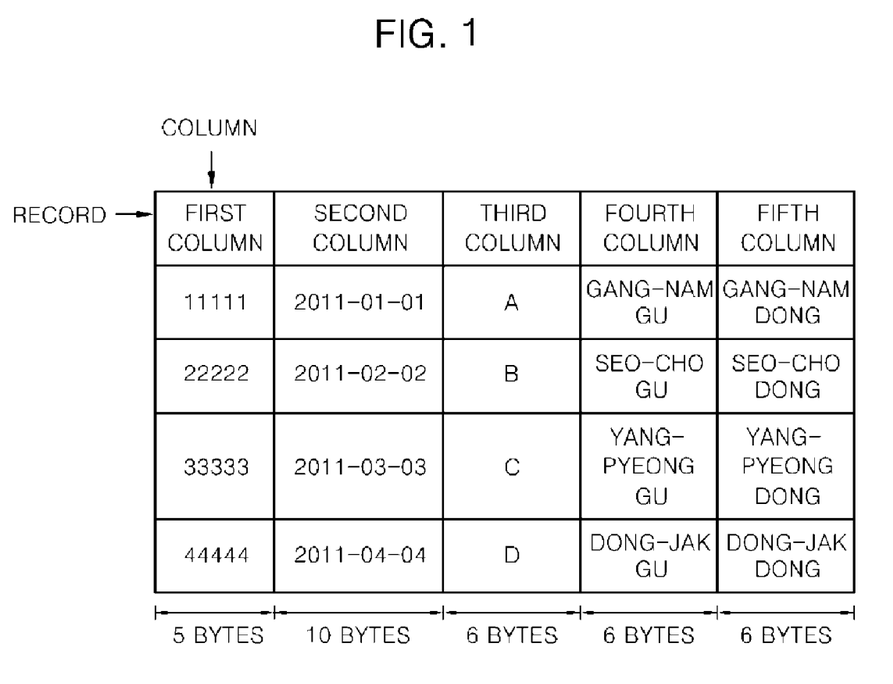
FIG. 1 and FIG. 2 respectively illustrate examples of a sequential access method (SAM) file and Java VO code for explaining a value conversion process of a conventional system.
Figure 2:
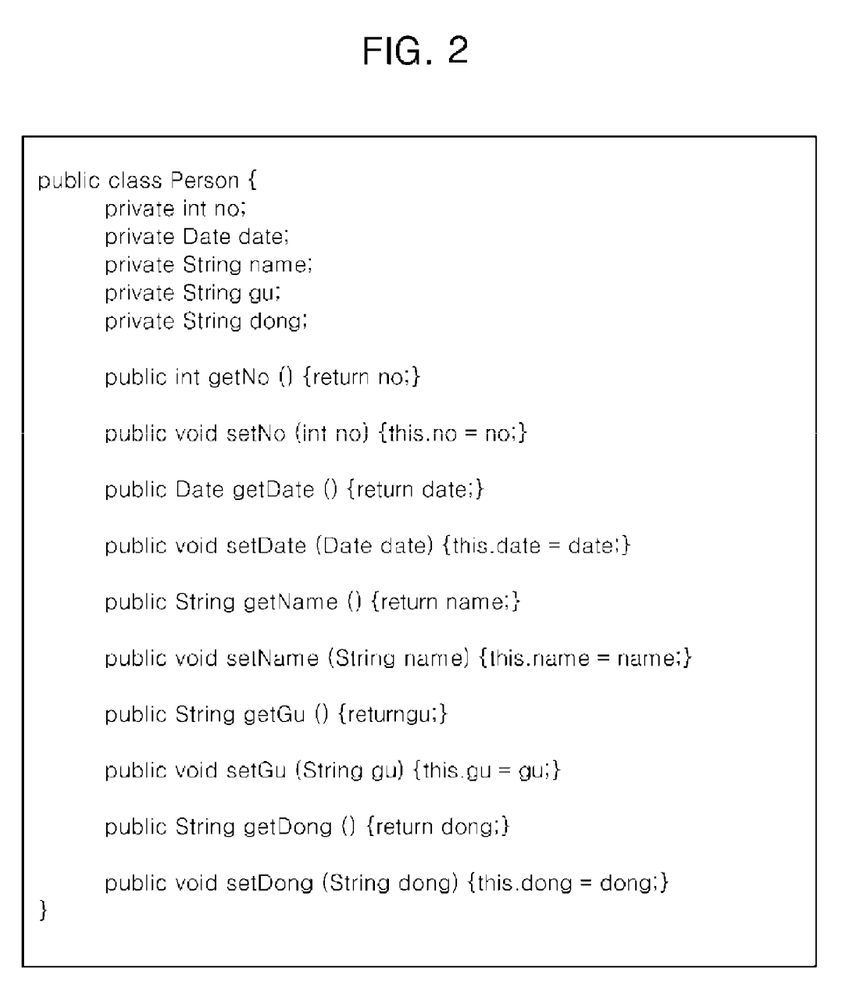

FIG. 1 and FIG. 2 respectively illustrate examples of a sequential access method (SAM) file and Java VO code for explaining a value conversion process of a conventional system.

Referring to FIGS. 1 and 2, a process for reading out data stored in a file, and executing ETL (Extract, Transformation, Load) work with a Java VO by Java code will be explained below.

In a first step, the data is read out from the file, and the Java is generated. In detail, the data of the file is read out for a size of one record in units of bytes. The size of one record may be 33 bytes. Since a size of the first column is 5 bytes, a size of the second column is 10 bytes, and a size of each of the third, the fourth, and the fifth columns is 6 bytes, 33 bytes may be divided to correspond to the size of each column. After this, every byte of the divided data is decoded based on a specific character set and converted into a character string. Here, unnecessary padding is removed. Character string data of the column is converted into a Java data type corresponding to each column. That is, since the first column has an integer, the second column has a date, and each of the third, the fourth, and the fifth columns has a character string type, the character string data of each column is converted to correspond to each column. Next, the Java VO (Person) is generated, and the converted data of each column corresponds to a field of the Java VO. Here, the data of the first column corresponds to a "no" field, the data of the second column corresponds to a "date" field, the data of the third column corresponds to a "name" field, the data of the fourth column corresponds to a "gu" field, and the data of the fifth column corresponds to a "dong" field.

In a second step, a work logic is processed with the Java VO. In order to use a value stored in the Java VO, a Getter Method such as getNo( ) and getName( ) is called and each field value is brought. A value changed by the work logic is reflected on the Java VO through a Setter Method such as setNo( ) and setName( ).

In a third step, result data of the Java VO by the work logic is recorded in a result file. In detail, every field of the Java VO is converted into a character string, and the character string of every field is encoded based on a specific character set and converted in units of bytes. Here, in order to adjust a byte length, if necessary, padding is added. Byte data of the encoded each field is gathered as one record data. Here, if necessary, padding is added. Finally, the gathered record data is recorded in the result file.

As described above, in order to process one record, the conventional system decodes every column of data and then generates the Java VO. Even when storing the Java VO as a file, the conventional system encodes every field and then generates data. In this case, even when only a portion of every field is used in a practical work logic, since the conventional system has to perform encoding or decoding even on a remaining unused field, unnecessary operation costs are incurred.

Figure 3:
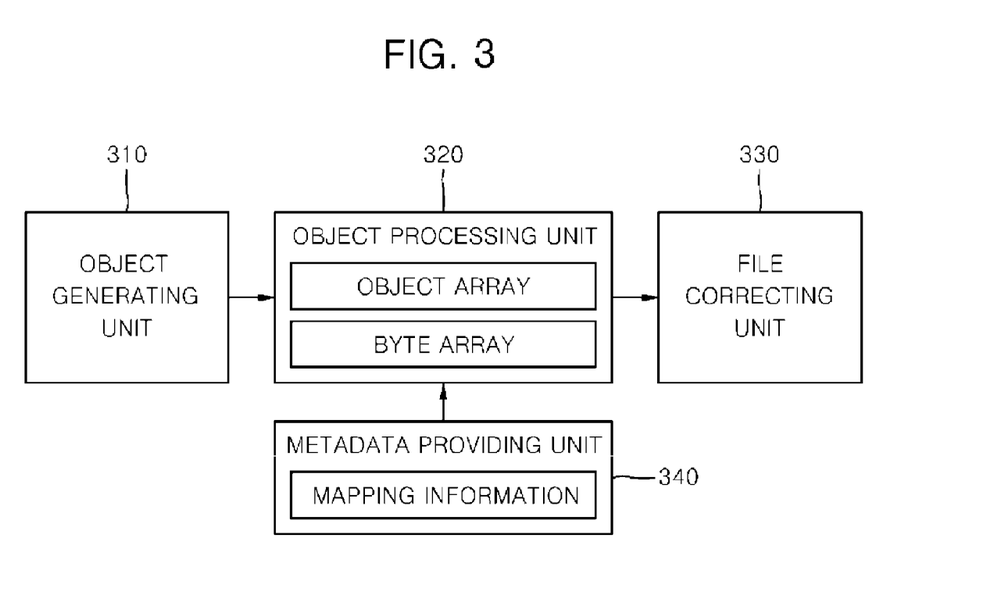
FIG. 3 is a block diagram illustrating a configuration of an apparatus for converting a VO according to a preferred exemplary embodiment of the present invention.

FIG. 3 is a block diagram illustrating a configuration of an apparatus for converting a VO according to a preferred exemplary embodiment of the present invention.

Referring to FIG. 3, the apparatus for converting a VO includes an object generating writ 310, an object generating unit 320, a file correcting unit 330, and a metadata providing unit 340.

The object generating unit 310 reads out raw data recorded in an input file in specific units which are previously set, and generates a VO corresponding to the specific units. It is desirable that the specific units are units of records of the file data and the VO corresponding to the specific units is a Java VO, but these are not absolute requirements.

The object processing unit 320 includes a byte array storing a column value included in the specific units and an object array storing a field value of the VO, and processes provision or change of the column value. In detail, the object processing unit 320 provides the field value of the VO corresponding to the specific column included in the specific units, or when the field value of the VO is changed, changes the specific column value included in the specific units. As a preferred embodiment, when the specific column value of the record is changed, the object processing unit 320 changes the field value of the Java VO corresponding to the specific column. That is, when a Getter Method or a Setter Method is called, the object processing unit 320 refers to and corrects the field value of the Java VO corresponding to the specific column of the record.

Further, the object value unit 320 includes a decoder and an encoder which are previously set corresponding to a format of the input file. The decoder converts a data type (data type of column) stored in the file into a data type (data type of field) of the VO, and the encoder converts the data type of the VO into the data type of the file.

The file correcting unit 330 calls a Method capable of bringing the changed field value of the VO (Java VO), brings the changed field value converted into the data type of the column and stored in the byte array, and records the changed field value in the input file. That is, a result file in which the input file is corrected is generated.

Finally, a metadata providing unit 340 provides metadata (mapping information including a size and a data type of each column included in the specific units (records) for the object processing unit 320. As a preferred embodiment, the metadata may be column layout information such as column length information of the record. Since the metadata providing unit 340 provides the metadata for the object processing unit 320, it does not need additional layout information and can process every object without loss of speed.

As described above, the apparatus for converting the VO according to the present invention reads out data recorded in the input file in specific units which are previously set, and generates the VO corresponding to the specific units. Here, on the basis of an embodiment in which the specific units are units of records of the file data, the VO corresponding to the specific units is the Java VO, an apparatus and a method for converting a VO according to the present invention will be explained.

Figure 4:
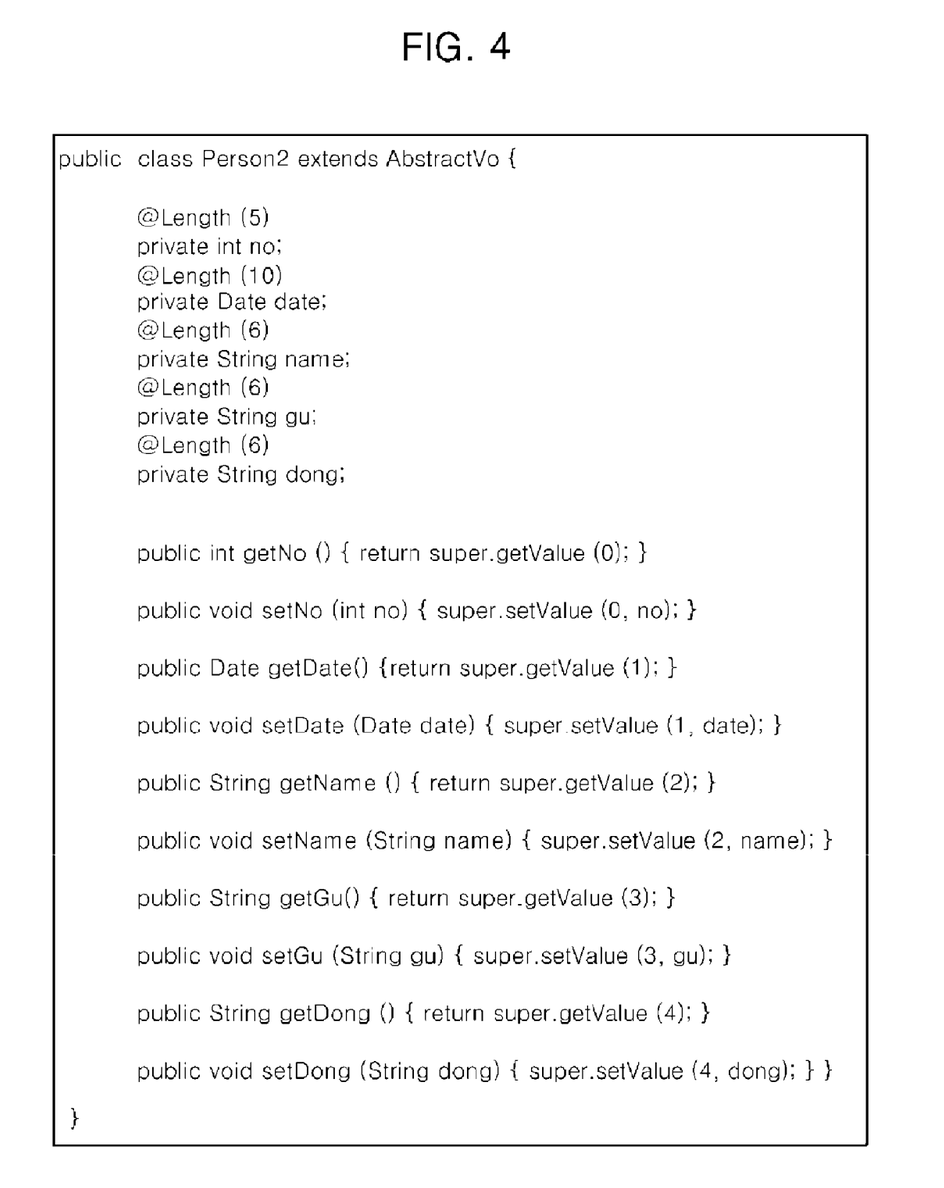
FIG. 4 is a diagram illustrating a Java VO code implemented by an apparatus for converting a VO according to an exemplary embodiment of the present invention.
Figure 5:
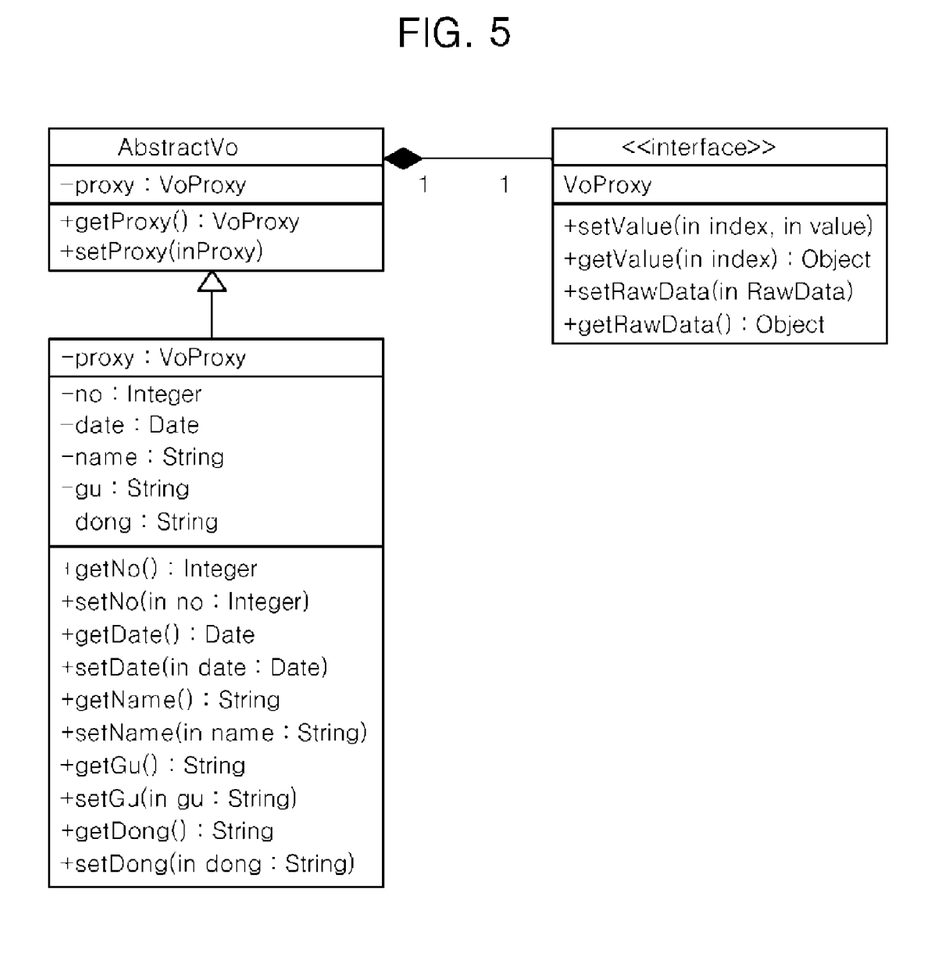
FIG. 5 is a diagram illustrating a code of an object that the Java VO inherits.

FIG. 4 is a diagram illustrating a Java VO code implemented by an apparatus for converting a VO according to an exemplary embodiment of the present invention, and FIG. 5 is a diagram illustrating a code of an object that the Java VO inherits.

Referring to FIGS. 4 and 5, a Java VO of FIG. 4 inherits AbstractVO, and each field has @Length annotation which represents column length information of a record stored in an input file. A value indicated by @Length annotation is provided as length information of a corresponding column by the metadata providing unit 340 when processing data in the object processing unit 320.

Further, the present invention may be implemented so that every Getter Method or Setter Method of the Java VO is delegated to a proxy object included in AbstractVO. Accordingly, the proxy object, that is, the object processing unit 320, substantially performs operations of bringing and changing the field value, and converting the field value into a data type of a record (column).

It can be known that an inheritance relationship and structures of the Getter Method and the Setter Method of the Java VO of FIG. 4 offered in the present invention are changed compared with the Java VO of FIG. 2. If a large number of Java VOs have been previously developed as the conventional type shown in FIG. 2, it may be difficult to redefine every conventional Java VO as the type shown in FIG. 4. In this case, when generating the Java VO in the object generating unit 310, a structure of the conventional Java VO can be dynamically changed to the type of the Java VO of FIG. 4 using Java BCI (Byte Code Instrumentation).

Figure 6:
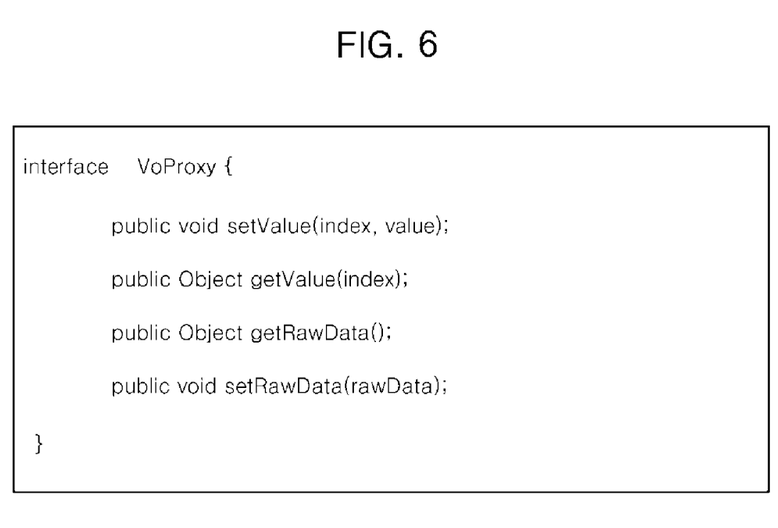
FIG. 6 is a diagram illustrating an interface code of an object processing unit.
Figure 7:
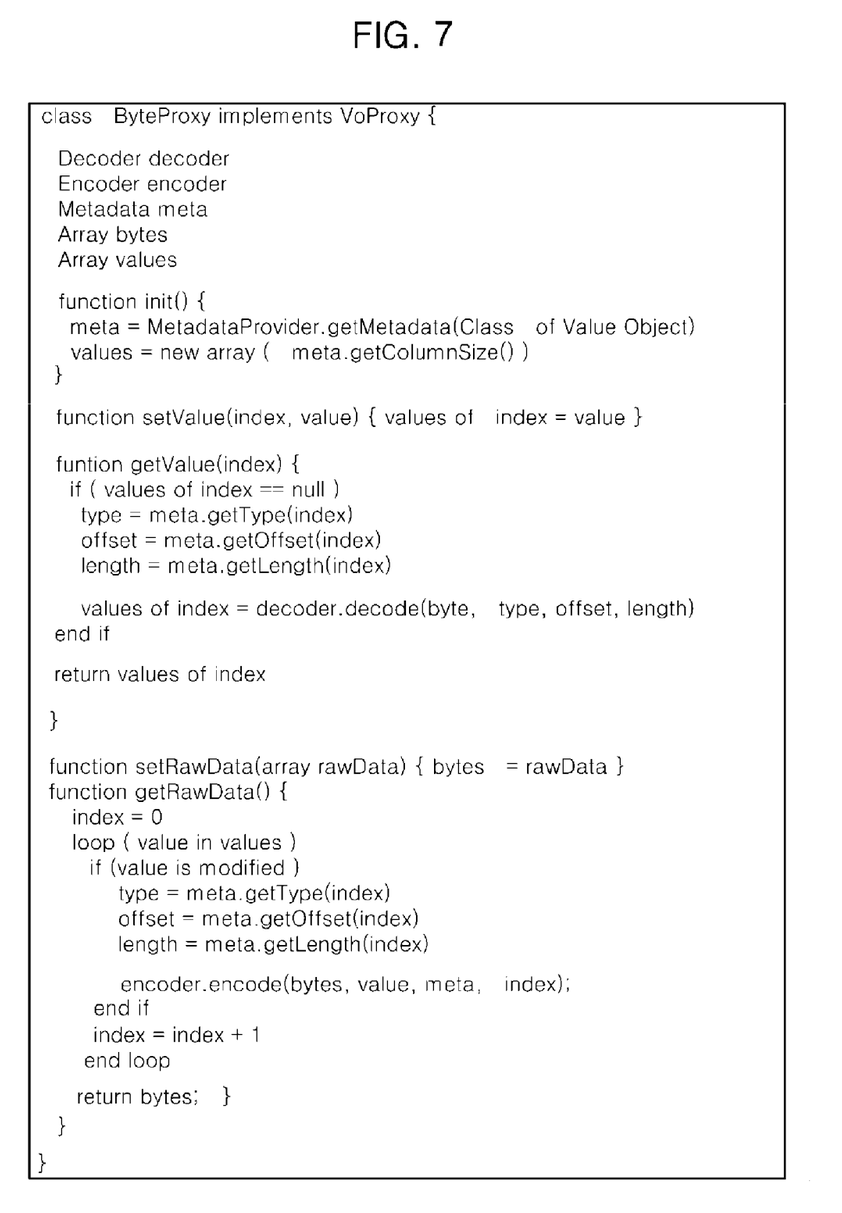
FIG. 7 is a diagram illustrating a pseudo-code of an object processing unit.

FIG. 6 is a diagram illustrating an interface code of an object processing unit, and FIG. 7 is a diagram illustrating a pseudo-code of an object processing unit.

Referring to FIGS. 6 and 7, mapping information of an index column is acquired metadata, and the index column of bytes is decoded and converted into Java data, or the Java data is converted and stored in the index column of bytes.

Figure 8:
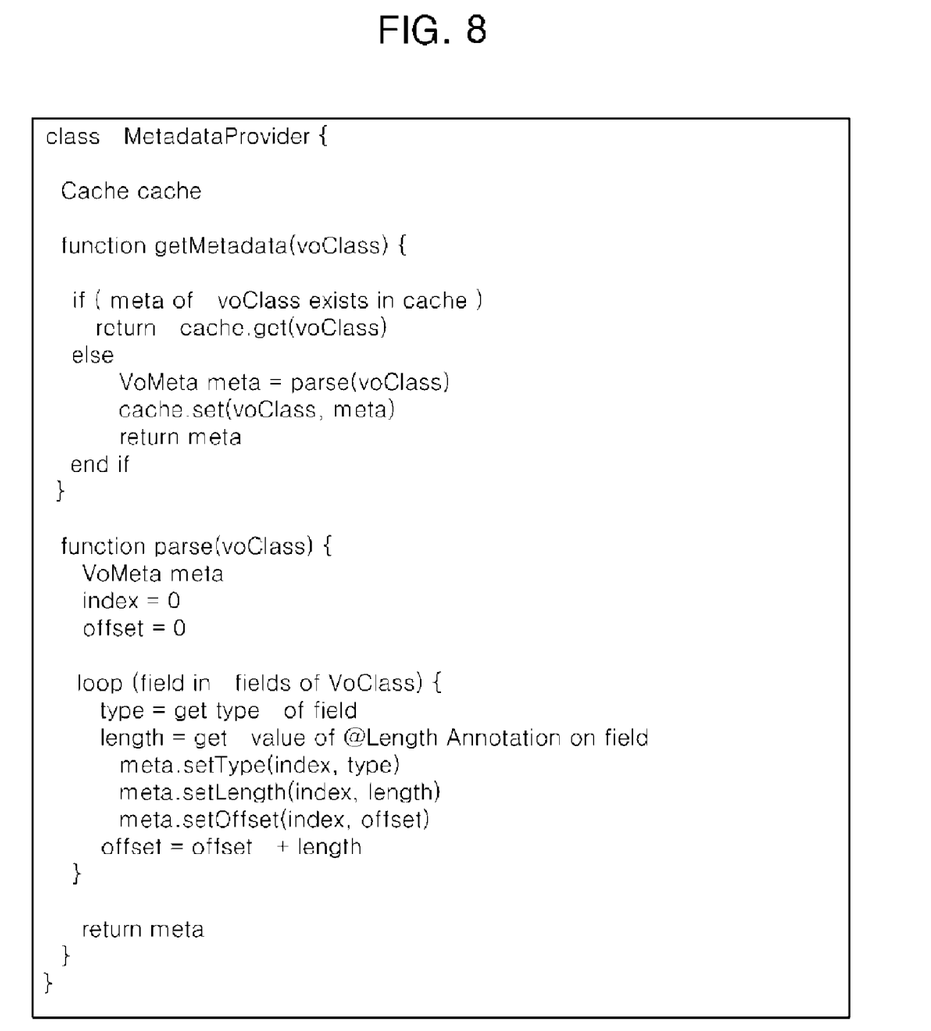
FIG. 8 is a diagram illustrating a pseudo-code of a metadata providing unit.

FIG. 8 is a diagram illustrating a pseudo-code of a metadata providing unit.

Referring to FIG. 8, the object processing unit 320 calls a getMetadata( ) Method that the metadata providing unit 340 provides, and acquires the metadata needed for data processing. The metadata providing unit 340 may internally store the metadata in a cache, and generate the metadata only one time. The metadata includes a length of each column, a data type of a Java VO, and an offset, and can be acquired from the Java VO using Java reflection technology.

Figure 9:
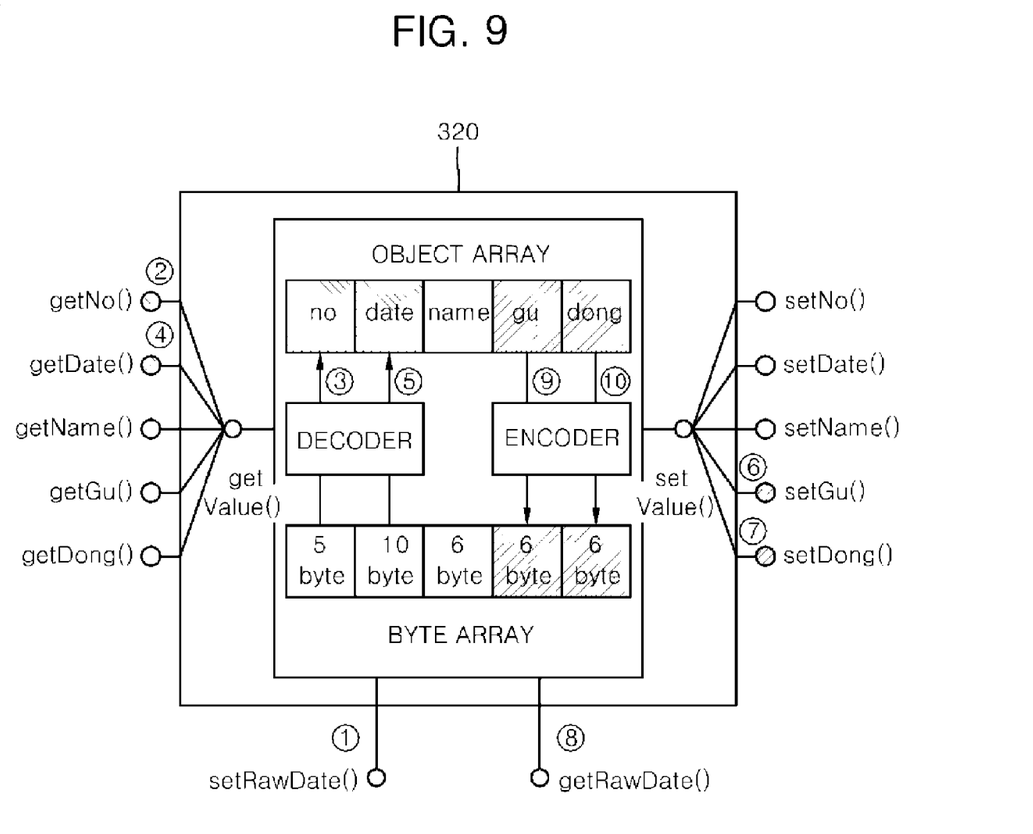
FIG. 9 is a diagram for explaining a method for converting a VO according to an exemplary embodiment of the present invention based on the input file of FIG. 1 and the Java VO of FIG. 4.

FIG. 9 is a diagram for explaining a method for converting a VO according to an exemplary embodiment of the present invention based on the input file of FIG. 1 and the Java VO of FIG. 4.

Referring to FIG. 9, as described above, when the Java VO is generated in the object generating unit 310, a byte proxy is set. Substantially, the byte proxy, that is, the object processing unit 320, processes data.

The object processing unit 320 acquires information that a file input from metadata provided from the metadata providing unit 340 has 5 fields and corresponds to a record of 33 bytes, and generates an object array and a byte array. The object array is initialized as a "NULL" value, and the object generating unit 310 calls a setRawData( ) Method of the object processing unit 320 which calls data recorded in the input file in units of records, and stores a column value of the record in the byte array.

When a Method capable of bringing the field value of the Java VO corresponding to a specific column of the record according to specific work is called, the object processing unit 320 calls a SubMethod which is previously set corresponding to the Method.

Here, if the field value of the Java VO corresponding to the specific column stored in the object array is the "NULL" value, the object processing unit 320 converts a specific column value stored in the byte array through a decoder which is previously set corresponding to a format of the input file, and then stores the converted value in the object array. The object processing unit 320 returns the converted value stored in the object array in response to the submethod and the method of the specific work logic.

On the other hand, if the field value of the Java VO corresponding to the specific column stored in the object array is not the "NULL" value, the object processing unit 320 returns the field value of the Java VO stored in the object array in response to the submethod and the method of the specific work logic.

In detail, if a getNO( ) Method is called in the specific work logic, the getNO( ) Method of the object processing unit 320 is called as a SubMethod corresponding thereto. If a value of a first item of the object array is the "NULL" value, the object processing unit 320 converts 5 bytes of the first column from the byte array through the decoder into a "no" value, stores the converted value in the object array, and then returns the converted value. Similarly, if the getNO( ) Method is called in the specific work logic, the getNO( ) Method of the object processing unit 320 is called as the SubMethod corresponding thereto. Similarly, if a value of a second item of the object array is the "NULL" value, the object processing unit 320 converts 10 bytes of the second column from the byte array through the decoder into a "date" value, stores the converted value in the object array, and then returns the converted value. On the other hand, if the field value stored in the object array is not the "NULL" value, the object processing unit 320 returns the field value stored in the object array in response to the SubMethod and the method without converting the column value stored in the byte array.

Further, if a Method capable of changing the specific field of the Java VO is called according to the specific work, the object processing unit 320 calls the SubMethod which is previously set in response to the Method, and stores the changed field value in the object array.

In detail, if a setGU( ) Method is called in the specific work logic, the setGU( ) Method of the object processing unit 320 is called as a SubMethod corresponding thereto. The object processing unit 320 changes a fourth value of the object array using a value transferred as a parameter. Similarly, if a setDong( ) Method is called in the specific work logic, the setValue( ) Method of the object processing unit 320 is called as a SubMethod corresponding thereto. The object processing unit 320 changes a fifth value of the object array using the value transferred as the parameter.

After this, if a Method capable of bringing the field value changed according to specific work is called, the object processing unit 320 converts the changed field value into a data type of a column corresponding to the changed field value of the Java VO through an encoder which is previously set corresponding a format of the input file. The data type is included in the metadata, and the object processing unit 320 refers to and converts the data type, and then stores the converted value in the byte array.

The file correcting unit 340 calls a Method capable of bringing the changed field value, brings the value converted into the data type of the column and stored in the byte array, and records the converted value in the input file. As a result, a result file which is a corrected version of the input file is generated.

In detail, in order to convert the field value of the Java VO into the data type suitable for the file format, the file correcting unit 340 calls a getRawDate( ) Method. Accordingly, the object processing unit 320 checks that the fourth value "gu" and the fifth value "dong" are changed, and converts each field value into the data type of the column using the encoder to store the converted value in the byte array. The converted value is a result value of the getRawData( ), is transferred to the file correcting unit 340, and is recorded in the input file.

Consequently, only 15 bytes corresponding to the first and the second columns of record data having a total length of 33 bytes are decoded, and only the fourth and the fifth columns are encoded. It can be known that conversion costs are reduced compared with the conventional art in which encoding and decoding are performed for all 33 bytes.

Further, besides Java, the method of converting the VO according to the present invention can be applied to a strong-typed language like Java in which a data type is definitely defined.

Figure 10:
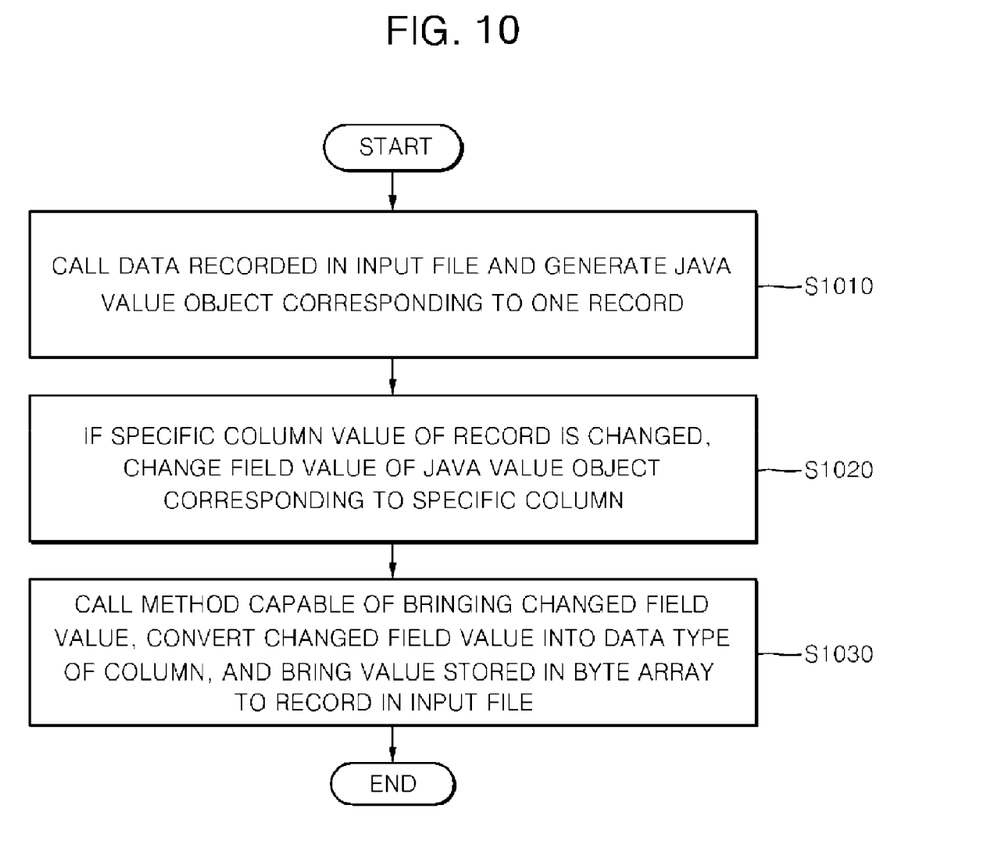
FIG. 10 is a flowchart illustrating an execution process of a method for converting a VO according to a preferred exemplary embodiment the present invention.

FIG. 10 is a flowchart illustrating an execution process of a method for converting a VO according to a preferred exemplary embodiment the present invention.

The object processing unit 320 reads out raw data recorded in the input file in units of records, and generates a Java VO corresponding to one record (S1010).

After this, if a specific column value of the record is changed, the object processing unit 320 changes a field value of the Java VO corresponding to the specific column (S1020). The object processing unit 320 includes a byte array in which a column value included in the record is stored, an object array in which the field value of the Java VO is stored, and a decoder and an encoder which are previously set corresponding to a format of the input file.

After this, the file correcting unit 330 calls a Method capable of bringing the changed field value, brings a value converted into a data type of a column and stored in the byte array, and records the converted value in the input file (S1030). As a result, conversion costs are reduced by encoding and decoding only necessary data rather than encoding and decoding all data of the record of the file.

The exemplary embodiments of the inventive concept can also be embodied as computer-readable codes on a computer-readable recording medium. The computer-readable recording medium is any data storage device that can store data which can be thereafter read by a computer system. Examples of the computer-readable recording medium, in non-transitory form, include a ROM (read only memory), a RAM (random access memory), a CD-ROM (compact disc), a magnetic tape, a floppy disk, an optical data storage, and so on. Further, the recording medium may be implemented in a transitory form such as carrier waves used in Internet transmission. The computer-readable recording medium can also be distributed over computer systems connected through a wired/wireless communication network so that the computer-readable code is stored and executed in a distributed fashion. A computer system, such as the one mentioned above, is very familiar to those who practice in these technical arts. Therefore, the discussion herein has avoided obscuring the key features of the exemplary embodiments by purposefully omitting details concerning the manner in which a hardware processor of such a computer system uses the above-identified computer-readable codes and data storage device to carry out the various functions or implement the various units previously mentioned. Likewise, since a person familiar with this field understands that such functions and units may be implemented through various combinations of hardware and/or software, such implementation details are likewise omitted.

According to the present invention, when generating the VO from data stored with different data formats, and when converting the VO into the different data formats, conversion costs are minimized and data processing performance is improved. Particularly, in a system for mass-processing master data such as a batch system, considerable performance improvement can be anticipated. Since an operation is internally performed through a proxy object located in the Java VO, correction and change costs of a program can be minimized by improving only a type of the Java VO without correcting a work code. Further, conversion between a record and the Java VO can be performed at high speed, even without additionally setting column layout information or developing a mapper class, by improving performance and development-related problems of the conventional mapper and describing mapping information in the Java VO.

It will be apparent to those skilled in the art that various modifications can be made to the above-described exemplary embodiments of the present invention without departing from the spirit or scope of the invention. Thus, it is intended that the present invention cover all such modifications provided they fall within the scope of the appended claims and their equivalents.

What is claimed is:
1. An apparatus for converting a value object, comprising:
an object generating unit configured to read out data recorded in an input file in specific units, and to generate the value object corresponding to the specific units;
an object processing unit configured to: include a byte array, the byte array storing a column value included in the specific units, include an object array, the object array storing a field value of the value object, and process one or more of provision and change of the column value;

a metadata providing unit configured to provide metadata, including a size and a data type of each column included in the specific units, for the object processing unit; and a hardware processor configured to implement one or more of the object generating unit, the object processing unit, and the metadata providing unit, wherein the object processing unit comprises a decoder being set based on a format of the input file, and is further configured to: call a second method adapted to retrieve the field value of the value object corresponding to a specific column included in the specific units, and use the decoder to convert the specific column value stored in the byte array; and when the second method is called, and when the field value retrieved is a "NULL" value, the object processing unit uses the decoder to convert the specific column value, stores the converted value in the object array, and returns the converted and stored value.

2. The apparatus of claim 1, wherein the object processing unit is further configured to provide the field value of the value object corresponding to the specific column included in the specific units and to change a value of a specific column value included in the specific units when the field value of the value object is changed.

3. The apparatus of claim 1, wherein the specific units are records of the data recorded in the input file.

4. The apparatus of claim 1, wherein the object processing unit is further configured to call a first method of reading out the data recorded in the input file by the specific units, and store the column value included in the specific units in the byte array.

5. The apparatus of claim 4, wherein:
the object processing unit is further configured to call a third method adapted to retrieve the field value of the value object corresponding to a specific column included in the specific units, and when the third method is called, and when the field value of the value object stored in the byte array is not a "NULL" value, the object processing unit returns the retrieved field value.

6. The apparatus of claim 1, wherein:
the object processing unit is further configured to call a fourth method adapted to change a specific field value of the value object, and when the fourth method is called, the object processing unit stores a changed field value in the object array.

7. The apparatus of claim 6, further comprising an encoder, wherein:
the encoder is set corresponding to a format of the input file; and the object processing unit is further configured to use the encoder to convert the changed field value into a data type of a column, corresponding to the changed field value, indicated in the metadata, and to store the converted value in the byte array.

8. The apparatus of claim 7, further comprising a file correcting unit configured to call a fifth method adapted to retrieve the changed field value, retrieve the value converted into a data type of the column and stored in the byte array, and record the converted and stored value into the input file.

9. A method for converting a value object, comprising:
reading out data recorded in an input file in specific units;
generating the value object corresponding to the specific units; and processing one or more of provision and change of a column value using at least one of a byte array storing the column value included in the specific units, an object array storing a field value of the value object, and metadata including a size and a data type of each column included in the specific units;

wherein at least one of the reading, generating and processing is implemented using a hardware processor, and wherein the processing includes,
setting a decoder based on a format of the input file;
calling a second method adapted to retrieve the field value of the value object corresponding to a specific column included in the specific units; and when the second method is called, and when the field value retrieved is a "NULL" value, performing the processing by:
using the decoder to convert the specific column value;
storing the converted value in the object array; and
returning the converted and stored value.

10. The method of claim 9, wherein the processing of the column value is performed by providing the field value of the value object corresponding to a specific column included in the specific units and by changing a value of the specific column included in the specific units when the field value of the value object is changed.

11. The method of claim 9, wherein the specific units are records of the data recorded in the input file.

12. The method of claim 9, wherein the generating of the value object comprises:
calling a first method adapted to read out the data recorded in the input file by the specific units; and
storing the column value included in the specific units in the byte array.

13. The method of claim 12, further comprising:
calling a third method adapted to retrieve the field value of the value object corresponding to the specific column included in the specific units;

when the third method is called, and when the field value of the value object stored in the byte array is not a "NULL" value, performing the processing by returning the retrieved field value.

14. The method of claim 9, further comprising:
calling a fourth method adapted to change a specific field value of the value object, and when the fourth method is called, performing the processing by storing a changed field value in the object array.

15. The method of claim 14, further comprising:
setting an encoder corresponding to a format of the input file;
performing the processing by:
using the encoder to convert the changed field value into a data type of a column, corresponding to the changed field value, indicated in the metadata; and
storing the converted value in the byte array.

16. The method of claim 15, further comprising:
calling a fifth method adapted to retrieve the changed field value;
retrieving the value converted into a data type of the column and stored in the byte array; and
recording the converted and stored value in the input file.

17. A non-transitory computer-readable medium having recorded thereon a program adapted to enable a hardware processor of a computer system to implement:
reading out data recorded in an input file in specific units;
generating the value object corresponding to the specific units; and processing one or more of provision and change of a column value using at least one of a byte array storing the column value included in the specific units, an object array storing a field value of the value object, and metadata including a size and a data type of each column included in the specific units, wherein the processing includes, setting a decoder based on a format of the input file;

calling a second method adapted to retrieve the field value of the value object corresponding to a specific column included in the specific units; and when the second method is called, and when the field value retrieved is a "NULL" value, performing the processing by:

using the decoder to convert the specific column value;

storing the converted value in the object array; and returning the converted and stored value.

* * * * *